United States Patent
Jyogan et al.

(10) Patent No.: US 11,712,091 B2
(45) Date of Patent: Aug. 1, 2023

(54) WATER REPELLENT PRODUCT AND METHOD FOR PRODUCING WATER REPELLENT PRODUCT

(71) Applicant: YKK Corporation, Tokyo (JP)

(72) Inventors: Toshiyuki Jyogan, Kurobe (JP); Takashi Saito, Kurobe (JP)

(73) Assignee: YKK Corporation, Tokyo (JP)

(*) Notice: Subject to any disclaimer, the term of this patent is extended or adjusted under 35 U.S.C. 154(b) by 250 days.

(21) Appl. No.: 17/166,802

(22) Filed: Feb. 3, 2021

(65) Prior Publication Data

US 2021/0235822 A1 Aug. 5, 2021

(30) Foreign Application Priority Data

Feb. 5, 2020 (JP) ................................ 2020-017676

(51) Int. Cl.
*A44B 19/32* (2006.01)
*C09D 183/04* (2006.01)

(52) U.S. Cl.
CPC ............ *A44B 19/32* (2013.01); *C09D 183/04* (2013.01)

(58) Field of Classification Search
CPC ...... A44B 19/32; A44B 19/34; C09D 183/04; D06M 13/02; D06M 15/564; D06M 15/643; D06M 2200/12; D06M 17/04; D06N 3/125; D06N 2211/10
See application file for complete search history.

(56) References Cited

U.S. PATENT DOCUMENTS

| | | | | |
|---|---|---|---|---|
| 4,480,009 A | * | 10/1984 | Berger | .................. C07F 7/0889 428/447 |
| 4,499,149 A | * | 2/1985 | Berger | .................. C08G 77/48 257/788 |
| 4,539,733 A | | 9/1985 | Yoshida | |
| 6,083,602 A | * | 7/2000 | Caldwell | ........... A61F 13/53708 604/385.01 |
| 8,318,869 B2 | * | 11/2012 | Russo | ................. D06M 15/277 525/410 |
| 8,327,509 B2 | * | 12/2012 | Kusayama | ............. A44B 19/32 24/389 |
| 8,722,826 B2 | * | 5/2014 | Pacetti | ................. C09D 133/14 526/277 |

(Continued)

FOREIGN PATENT DOCUMENTS

| CN | 108468229 A | 8/2018 |
|---|---|---|
| CN | 209660600 U | 11/2019 |

(Continued)

OTHER PUBLICATIONS

Extended European Search Report, European Patent Application No. 21154974.6, dated Jul. 5, 2021, 9 pages.

*Primary Examiner* — Robert Sandy
*Assistant Examiner* — Louis A Mercado
(74) *Attorney, Agent, or Firm* — Kilpatrick Townsend & Townsend LLP

(57) ABSTRACT

A water repellent product includes a water repellent fabric in which a non-fluorine-based water repellent agent is applied to a fabric formed of a fiber; and a resin component attached to the water repellent fabric. The water repellent product contains substantially no cross-linking agent for chemically bonding the non-fluorine-based water repellent agent and the fiber.

7 Claims, 3 Drawing Sheets

(56) References Cited

U.S. PATENT DOCUMENTS

| | | | |
|---|---|---|---|
| 8,771,798 B2* | 7/2014 | Williams | C09D 5/1662 |
| | | | 427/387 |
| 8,793,814 B1* | 8/2014 | Dilanni | D03D 13/004 |
| | | | 2/97 |
| 9,301,579 B2* | 4/2016 | Fujii | A44B 19/32 |
| 9,878,185 B2* | 1/2018 | Underwood | A41D 1/02 |
| 9,974,720 B2* | 5/2018 | Sasaki | A61K 8/8152 |
| 10,433,593 B1* | 10/2019 | Dilanni | A41D 3/02 |
| 11,261,306 B2* | 3/2022 | Takani | C08J 7/042 |
| 11,564,429 B2* | 1/2023 | Truesdale, III | D06M 13/322 |
| 2005/0186873 A1* | 8/2005 | Wang | D06M 23/08 |
| | | | 442/79 |
| 2008/0147178 A1* | 6/2008 | Pacetti | A61L 31/16 |
| | | | 526/330 |
| 2009/0044347 A1* | 2/2009 | Kyriazis | D06M 15/423 |
| | | | 8/189 |
| 2014/0190614 A1 | 7/2014 | Ma et al. | |
| 2017/0130372 A1* | 5/2017 | Underwood | A41D 31/08 |
| 2021/0196010 A1* | 7/2021 | Jyogan | D06P 3/00 |

FOREIGN PATENT DOCUMENTS

| | | |
|---|---|---|
| EP | 1228713 A2 | 8/2002 |
| JP | S63-037845 Y2 | 10/1988 |
| JP | 2006-328624 A | 12/2006 |

* cited by examiner

WATER REPELLENT PRODUCT AND METHOD FOR PRODUCING WATER REPELLENT PRODUCT

CROSS-REFERENCE TO RELATED APPLICATIONS

The disclosure of Japanese Patent Application No. 2020-017676 filed on Feb. 5, 2020, including specification, drawings and claims is incorporated herein by reference in its entirety.

BACKGROUND

The present invention relates to a water repellent product including a water repellent fabric in which a non-fluorine-based water repellent agent is attached to a fiber fabric and a resin component attached to the water repellent fabric, and a method for producing the water repellent product. An example of the water repellent product is a fastener chain in a state in which a pair of fastener stringers mesh with each other.

A slide fastener includes a pair of fastener stringers and a slider that opens and closes the pair of fastener stringers as a basic configuration. In addition to including a tape formed of fibers and an element row fixed to one side edge portion of the tape, an example of the fastener stringer further includes, in a case of a fastener opening product, a resin reinforcing film attached to an end portion of the tape in a longitudinal direction of the tape (Patent Literature 1).

Various water repellent agents have been used to perform water repellent processing on a fabric of clothing. In a field of a slide fastener, a fluorine-based water repellent agent has been widely used as a water repellent agent that is most effective for imparting water repellency.

However, in recent years, due to growing awareness of environmental protection in the entire society, it is required to prevent environmental pollution as much as possible, and also in an apparel industry, it is required to regulate chemical substances that adversely affect the environment when products are manufactured. One of the chemical substances to be regulated is a fluorine compound. Based on this point of view, as for the water repellent agent used in the fastener chain, it is required to properly use a fluorine-based water repellent agent or a non-fluorine-based water repellent agent depending on an intended use. Patent Literature 2 discloses an example of a fastener chain to which a non-fluorine-based water repellent agent is attached.

Patent Literature 1: JP-UM-B-63-37845
Patent Literature 2: JP-A-2006-328624

SUMMARY

According to one aspect of an embodiment of the present invention, there is provided a water repellent product including:

a water repellent fabric in which a non-fluorine-based water repellent agent is applied to a fabric formed of a fiber; and a resin component attached to the water repellent fabric, wherein the water repellent product contains substantially no cross-linking agent for chemically bonding the non-fluorine-based water repellent agent and the fiber.

The water repellent product may be a fastener chain in which a pair of fastener stringers mesh with each other at facing side edge portions, and the fastener stringers include tapes which serve as a water repellent fabric and element rows which are fixed at the facing side edge portions of the tapes and mesh with each other.

The fastener chain may include a reinforcing film serving as the resin component attached at end portions of the tapes in a longitudinal direction.

According to another aspect of an embodiment of the present invention, there is provided a method for producing a water repellent product including a water repellent fabric in which a non-fluorine-based water repellent agent is applied to a fabric formed of a fiber and a resin component attached to the water repellent fabric, the method comprising;

performing a water repellent treatment while containing substantially no a cross-linking agent for chemically bonding the non-fluorine-based water repellent agent and the fiber.

In the method, the water repellent product may be a fastener chain in which a pair of fastener stringers mesh with each other at facing side edge portions, and he fastener stringers may include tapes which serve as a water repellent fabric and element rows which are fixed at the facing side edge portions of the tape and mesh with each other.

In the method, the fastener chain may include a reinforcing film serving as the resin component attached at end portions of the tapes in a longitudinal direction.

In the method, when the fabric is immersed in an aqueous solution using at least the non-fluorine-based water repellent agent as a solute, a concentration of the cross-linking agent in the aqueous solution may be a concentration containing substantially no cross-linking agent.

BRIEF DESCRIPTION OF DRAWINGS

FIG. 3 is a graph showing relation between the peel strength of the reinforcing film and the concentrations of the water repellent agent and the cross-linking agent and the like.

DETAILED DESCRIPTION OF EXEMPLIFIED EMBODIMENTS

There is a test (hereinafter referred to as a "water repellency evaluation test") for examining water repellency of a fastener chain. The water repellency evaluation test is conducted before the fastener chain is washed and after the fastener chain has been washed a set number of times, and it is desirable to attain high water repellency even after the washing.

In addition to the water repellency evaluation test, there is a test for examining an adhesion strength between the reinforcing film and the tape. A high adhesion strength means that the reinforcing film is less likely to be peeled off from the tape (a high peel strength). Therefore, the test for examining an adhesion strength is conducted by conducting a peel strength test in which the reinforcing film and the tape are forcibly peeled off and a strength at a time of the peeling is measured. A reason why the peel strength test is used is that the reinforcing film of the fastener chain to which the non-fluorine-based water repellent agent is applied is more likely to be peeled off from the tape as compared with that of the fastener chain to which the fluorine-based water repellent agent is applied. Incidentally, in a case in which the reinforcing film is transparent, when the reinforcing film is peeled off, the reinforcing film becomes cloudy and an appearance thereof is deteriorated.

The present invention has been made in view of the above-described circumstances. An object of the present invention is to improve a peel strength between a tape (a water repellent fabric) to which a non-fluorine-based water repellent agent is attached and a reinforcing film (a resin component).

As a water repellent product according to a first embodiment of the present invention, a fastener chain will be described below, and the slide fastener which is a premise of the fastener chain will be described first.

Figure 5:
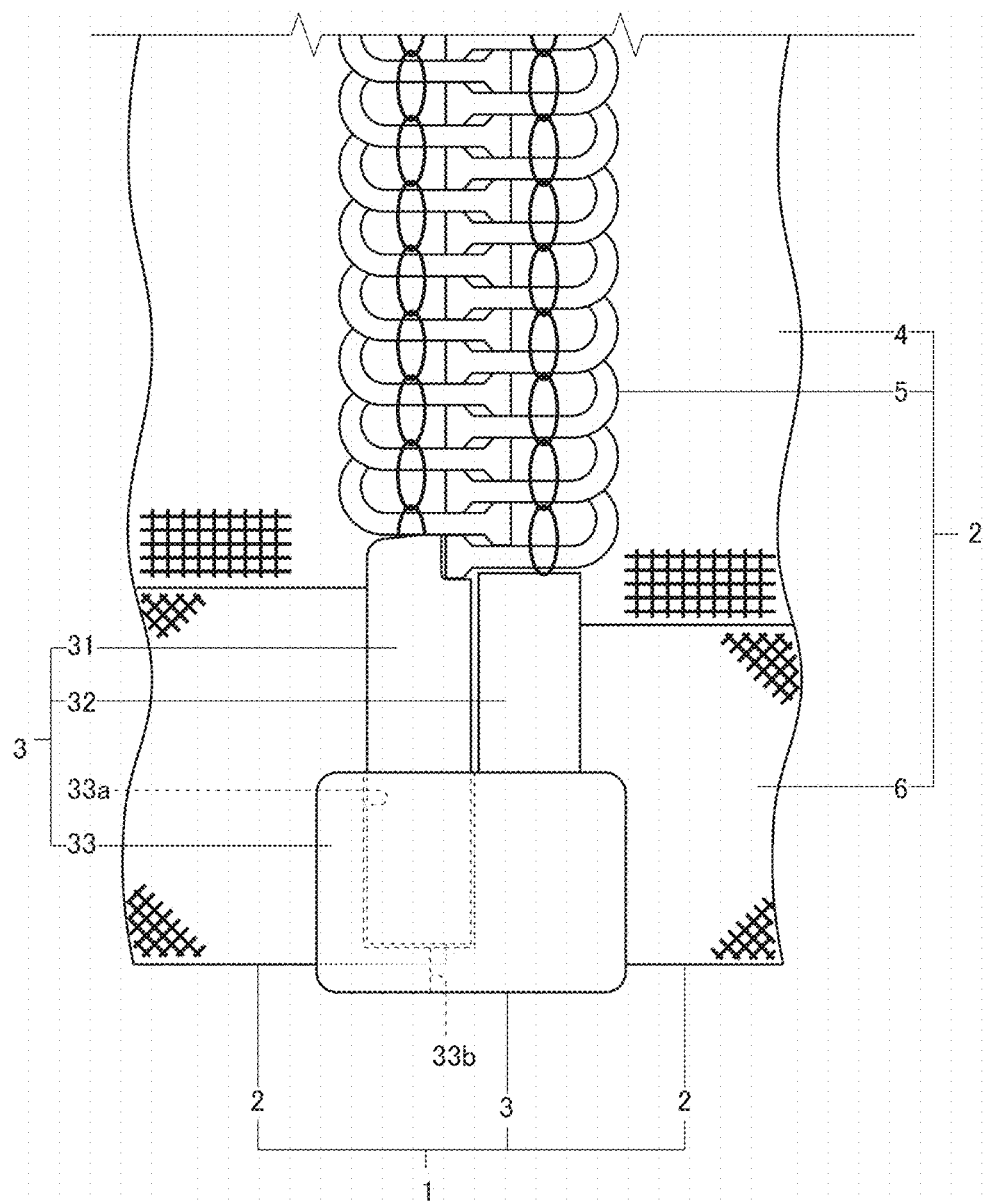
FIG. 5 is an illustrative view showing an example of a slide fastener.

As shown in FIG. 5, a slide fastener 1 has a band shape, and includes a pair of fastener stringers 2, 2 that face each other in a width direction of the band shape, a slider (not shown) that can open and close the pair of fastener stringers 2, 2 at facing side edge portions thereof, a stopper (not shown) that stops a movement of the slider at end portions of the pair of fastener stringers 2, 2 in a direction in which the pair of fastener stringers 2, 2 are closed, and an opening tool 3 configured to connect and disconnect the pair of fastener stringers 2, 2 at end portions of the pair of fastener stringers 2, 2 in a direction in which the pair of fastener stringers 2, 2 are opened. A state in which the slide fastener 1 is opened is a state in which the pair of fastener stringers 2, 2 are separated at the facing side edge portions, and a state in which the slide fastener 1 is closed is a state in which the pair of fastener stringers 2, 2 are meshed with each other at the facing side edge portions. The slide fastener 1 in the state in which the pair of fastener stringers 2, 2 are meshed with each other in this manner is referred to as a fastener chain.

The fastener stringer 2 includes a band-shaped tape 4 extending in a straight line, an element row 5 fixed along one side edge portion of the tape 4, and a reinforcing film 6 attached at either end portion of the tape 4 in a longitudinal direction (the direction in which the pair of fastener stringers 2, 2 are closed) of the tape 4. In this way, the fastener stringer 2 has a band-shaped structure in which the element row 5 is fixed, and thus the fastener stringer 2 is elongated. Therefore, the above-described "longitudinal direction" refers to a long direction of the fastener stringer 2, and the "width direction" refers to a narrow direction (a short direction) of the fastener stringer 2.

The tape 4 has a band shape, and is formed by assembling fibers. Therefore, the tape 4 is formed of fibers. A specific example of the tape 4 is a woven fabric or a knitted fabric.

The reinforcing film 6 is thinner than the tape 4, and is attached to at least one of a front surface and a back surface of the tape 4. The opening tool 3 is fixed in a state of sandwiching the reinforcing film 6 and the tape 4. The reinforcing film 6 is a resin component. Specific examples of a material of the reinforcing film 6 include a thermoplastic resin, and more detailed examples of the material of the reinforcing film 6 include nylon. The reinforcing film 6 is attached to the tape 4 by, for example, thermal welding or adhesion. An example of an adhesive is polyester.

The element row 5 is formed by, for example, a monofilament including elements that are continuous in the longitudinal direction along the facing side edge portions of the tape 4. The monofilament is, for example, bent into a coil shape, and is formed of resin. Incidentally, a core string is inserted into the monofilament. The monofilament is fixed to one surface of the tape 4 in a thickness direction of the tape 4 by a sewing thread. In a state of the fastener chain, the pair of tapes 4, 4 face each other with a gap therebetween in the width direction, and the pair of element rows 5, 5 are in a state of being meshed with each other at one surface in the thickness direction with respect to the pair of tapes 4, 4. The state of being meshed with each other is a state in which elements of one element row 5 and elements of the other element row 5 are meshed with each other.

The thread, the core string, and the sewing thread are, for example, a chemical fiber, a natural fiber, or a combination thereof. More specifically, examples of a synthetic fiber which is an example of the chemical fiber include hydrophobic synthetic fibers such as polyester, polypropylene, polyamide, acrylic, vinylon, aramid, acetate, and triacetate. Examples of the natural fiber include cotton, wool, silk, and the like.

In a case of producing the fastener stringer 2, a fixing step of fixing the element row 5 to the tape 4 by a sewing thread, a water repellent treatment step of applying a non-fluorine-based water repellent agent to the tape 4, and an attaching step of attaching the reinforcing film 6 to the tape 4 are sequentially performed. Before the water repellent treatment step, the reinforcing film 6 is not attached even though the pair of fastener stringers 2, 2 are in a state of being meshed with each other by the element row 5. Therefore, the pair of fastener stringers 2, 2 are referred to as an "incomplete fastener chain".

In the water repellent treatment step, for example, the incomplete fastener chain is passed through a liquid (for example, an aqueous solution containing water as a solvent) containing the water repellent agent as a solute, and then dried and heat-treated. The water repellent agent is applied to the fibers of the incomplete fastener chain by the water repellent treatment step.

The water repellent agent is a non-fluorine-based compound, and more specifically a hydrocarbon-based (a compound having a hydrocarbon group, for example, a paraffin-based) or silicone-based compound. Examples of the hydrocarbon-based water repellent agent include those whose main chain is a polyurethane group and whose side chain is a hydrocarbon group.

Further, the water repellent agent contains no cross-linking agent for chemically bonding the non-fluorine-based water repellent agent and the fibers (the tape 4). Examples of the cross-linking agent include compounds having one or more methylol melamine, isocyanate groups, or blocked isocyanate groups.

After the water repellent treatment step, the reinforcing film 6 is attached to the incomplete fastener chain and is cut to a desired length, and the opening tool 3, the slider, and the like are attached to the incomplete fastener chain, so that the slide fastener 1 is completed.

The opening tool 3 is commonly referred to as an opening and detaching fitting, and includes a separable pin 31 fixed to the facing side edge portion of one fastener stringer 2, a retainer pin 32 fixed to the facing side edge portion of the other fastener stringer 2, and a box 33 that is fixed in a continuous manner with the retainer pin 32 at the facing side edge portion of the other fastener stringer 2 and is configured to be connected to and disconnected from the separable pin 31.

The separable pin 31 extends in the longitudinal direction in a state of being separated from the element row 5, and is fixed in a manner of covering one tape 4 from the front and back surfaces of the one tape 4 and a side of the other tape 4. The reinforcing film 6 is fixed to the one tape 4 on the front and back surfaces of the one tape 4.

Similarly to the separable pin 31, the retainer pin 32 also extends in the longitudinal direction in a state of being separated from the element row 5, and is fixed in a manner of covering the other tape 4 from the front and back surfaces of the other tape 4 and a side of the one tape 4. The reinforcing film 6 is fixed to the other tape 4 on the front and back surfaces of the other tape 4.

The box 33 is shaped in a manner of covering the other tape 4 from the front and back surfaces and an end in the longitudinal direction, and projects toward the one tape 4. The box 33 is in a state of being continuous with the retainer pin 32 at an end of the retainer pin 32 in the longitudinal direction (is integrated with the retainer pin 32), and is formed with a hole 33a for an end portion of the separable pin 31 in the longitudinal direction to be taken in and out, and a slit 33b for the end portion of the one tape 4 in the longitudinal direction to be taken in and out. The slit 33b is in a state of communicating with the hole 33a.

The reason why the present inventors have conceived of the present invention is as follows. It is known that the non-fluorine-based water repellent agent has lower water repellency and is less likely to be applied to the fabric (the fibers) of the fastener stringer (poor adhesion), as compared with the fluorine-based water repellent agent. As a measure to prevent a decrease in water repellency after repeated washing for a fiber product to which the non-fluorine-based water repellent agent is applied, adhesion between the fibers and the non-fluorine-based water repellent agent is improved, thereby preventing the non-fluorine-based water repellent agent from falling off from the fibers after washing. As a specific measure, as disclosed in Patent Literature 2, it is common knowledge to use a cross-linking agent so as to improve the adhesion between the non-fluorine-based water repellent agent and the fibers (to strengthen chemical bonding). More specifically, Patent Literature 2 describes a use of an aqueous solution containing a non-fluorine-based water repellent agent and a cross-linking agent as a solute in the water repellent treatment step for applying the non-fluorine-based water repellent agent to the fibers.

Then, the present inventors applied a water repellent treatment step similar to that in Patent Literature 2 (used an aqueous solution containing a non-fluorine-based water repellent agent and a cross-linking agent as a solute) to produce the slide fastener, and conducted a water repellency test on the fastener chain after repeated washing. Then, as described in a section of technical problem, it can be seen that the reinforcing film of the fastener chain to which the non-fluorine-based water repellent agent is applied is more likely to be peeled off from the tape as compared with that of the fastener chain to which the fluorine-based water repellent agent is applied.

The present inventors have assumed that either the non-fluorine-based water repellent agent or the cross-linking agent may affect a peel strength. Therefore, the present inventors prepared two types of aqueous solutions, and evaluated relation between a concentration of a solute and a peel strength for an evaluation sample prepared using either aqueous solution by conducting a peel strength test. The first type of aqueous solution is a test aqueous solution (hereinafter, referred to as a "cross-linking agent-free aqueous solution") for evaluating whether the non-fluorine-based water repellent agent affects the peel strength, and as a solute, contains the non-fluorine-based water repellent agent but contains no cross-linking agent. The second type of aqueous solution is a test aqueous solution (hereinafter, referred to as a "cross-linking agent-containing aqueous solution") for evaluating whether the cross-linking agent affects the peel strength, and as a solute, contains no non-fluorine-based water repellent agent but contains the cross-linking agent. The two types of aqueous solutions are prepared in which concentrations of the solutes are different in a range of 1.0 mass % to 10.0 mass %. Then, the evaluation sample was prepared in which the fastener stringer was immersed in these aqueous solutions, the solutes were applied to the fastener stringer by drying, and thereafter, the reinforcing film was attached to the tape of the fastener stringer.

Figure 1:
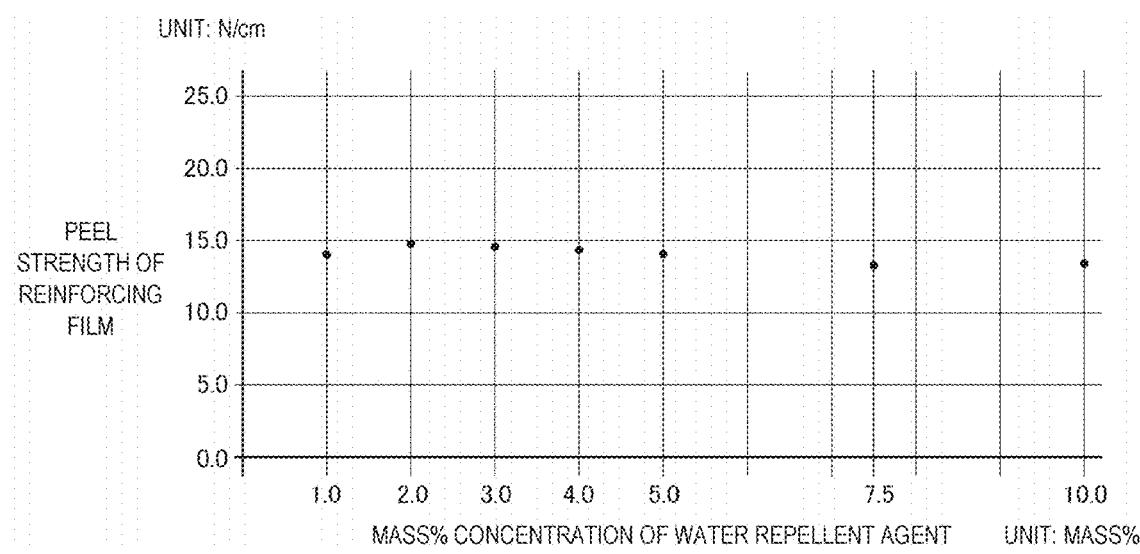
FIG. 1 is a graph showing relation between a peel strength of a reinforcing film and a concentration of a water repellent agent.
Figure 2:
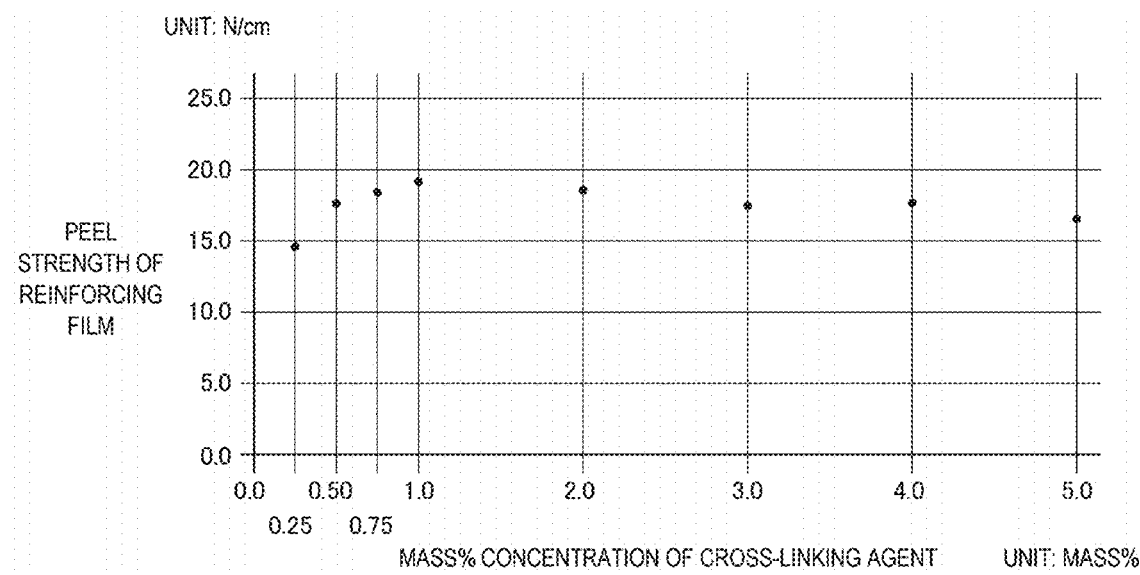
FIG. 2 is a graph showing relation between the peel strength of the reinforcing film and a concentration of a cross-linking agent.

Using this evaluation sample, the peel strength test was conducted before washing, and graphs in FIGS. 1 and 2 were created based on test results of the peel strength test. In the graphs in FIGS. 1 and 2, the peel strength (unit: N/cm) is used as a parameter on a vertical axis, and the concentration of the solute (unit: mass %) is used as a parameter on a horizontal axis. The aqueous solution contains water other than the water repellent agent or the cross-linking agent. The concentration of the solute is in a case in which a mass of the aqueous solution is 100%.

The graph in FIG. 1 shows peel strength test results of the evaluation sample of the cross-linking agent-free aqueous solution. The concentration of the non-fluorine-based water repellent agent was changed in the range of 1 mass % to 10 mass %. However, it can be seen that even though the concentration was increased, the peel strength was slightly lower than 15 N/cm and did not change much.

The graph in FIG. 2 shows peel strength test results of the evaluation sample of the cross-linking agent-containing aqueous solution. The concentration of the cross-linking agent was changed in a range of 0.25 mass % to 5 mass %. However, it can be seen that even if the concentration was increased, the peel strength was approximately 15 N/cm or more and did not decrease much.

Therefore, from the graphs in FIGS. 1 and 2, it can be seen that even if the concentration of the non-fluorine-based water repellent agent alone or the cross-linking agent alone increases, the peel strength does not decrease much. Therefore, the present inventors have assumed that the peel strength may decrease due to using the non-fluorine-based water repellent agent and the cross-linking agent in combination.

Then, the following test was conducted to investigate an influence of a mixing ratio of the non-fluorine-based water repellent agent and the cross-linking agent on the peel strength. An aqueous solution was prepared in which the concentration of the non-fluorine-based water repellent agent was changed in increments of 0.5 mass % in a range of 2.0 mass % to 4.0 mass %, the concentration of the cross-linking agent was changed in increments of 0.25 mass % in a range of 0 mass % to 1.0 mass %, and the rest was water. As a comparative example, an aqueous solution (an aqueous solution containing no cross-linking agent) containing the fluorine-based water repellent agent as a solute was also prepared. The evaluation sample was prepared in which the fastener stringer was immersed in these aqueous solutions, the solutes were applied to the fastener stringer by drying, and thereafter, the reinforcing film was attached to the tape of the fastener stringer. Using this evaluation sample, the peel strength test was conducted before washing, and Table 1 and FIG. 3 were created based on test results of the peel strength test.

TABLE 1

| Water repellent agent concentration [mass %] | 2 | 2 | 2 | 2 | 2 |
|---|---|---|---|---|---|
| Cross-linking agent [mass %] | 0 | 0.25 | 0.5 | 0.75 | 1 |
| N/cm Average value | 15.38 | 11.20 | 10.04 | 9.26 | 8.70 |
| Pass and fail determination strength | 15.00 | 15.00 | 15.00 | 15.00 | 15.00 |
| Water repellent agent concentration [mass %] | 2.5 | 2.5 | 2.5 | 2.5 | 2.5 |
| Cross-linking agent [mass %] | 0 | 0.25 | 0.5 | 0.75 | 1 |
| N/cm Average value | 15.24 | 11.48 | 10.58 | 9.36 | 9.00 |
| Pass and fail determination strength | 15.00 | 15.00 | 15.00 | 15.00 | 15.00 |
| Water repellent agent concentration [mass %] | 3 | 3 | 3 | 3 | 3 |
| Cross-linking agent [mass %] | 0 | 0.25 | 0.5 | 0.75 | 1 |
| N/cm Average value | 15.18 | 12.02 | 10.16 | 9.82 | 9.02 |
| Pass and fail determination strength | 15.00 | 15.00 | 15.00 | 15.00 | 15.00 |
| Water repellent agent concentration [mass %] | 3.5 | 3.5 | 3.5 | 3.5 | 3.5 |
| Cross-linking agent [mass %] | 0 | 0.25 | 0.5 | 0.75 | 1 |
| N/cm Average value | 15.14 | 11.82 | 10.60 | 9.78 | 9.24 |
| Pass and fail determination strength | 15.00 | 15.00 | 15.00 | 15.00 | 15.00 |
| Water repellent agent concentration [mass %] | 4 | 4 | 4 | 4 | 4 |
| Cross-linking agent [mass %] | 0 | 0.25 | 0.5 | 0.75 | 1 |
| N/cm Average value | 14.78 | 11.66 | 10.86 | 9.78 | 9.40 |
| Pass and fail determination strength | 15.00 | 15.00 | 15.00 | 15.00 | 15.00 |

Figure 3:
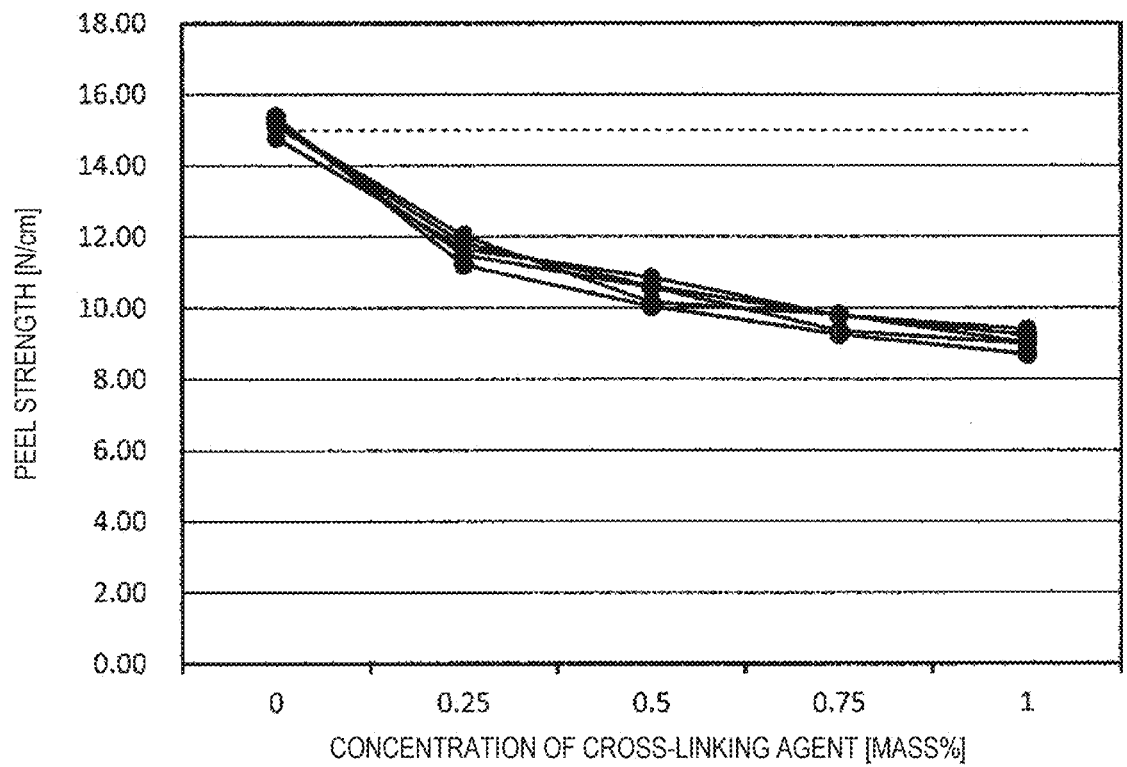

A value of the peel strength of the evaluation sample in Table 1 is an average value of 10 samples. Incidentally, Table 1 and FIG. 3 show the test results of the evaluation sample when the non-fluorine-based water repellent agent was used, and does not show the test results of the evaluation sample when the fluorine-based water repellent agent was used. However, since the peel strength of the evaluation sample was approximately 15 (N/cm) when the fluorine-based water repellent agent was used, a pass and fail determination standard in Table 1 is 15 (N/cm), and FIG. 3 shows a position of 15 (N/cm) with a broken line.

From the graph of FIG. 3, it can be seen that if the concentrations of the non-fluorine-based water repellent agent are the same, the peel strength tends to decrease as the concentration of the cross-linking agent increases. This tendency appears regardless of the concentration of the non-fluorine-based water repellent agent. It can be seen that the peel strength of approximately 15 (N/cm) equivalent to that when the fluorine-based water repellent agent is used is indicated when an aqueous solution in which the concentration of the cross-linking agent is 0 mass % is used. From this result, the present inventors have assumed that it may be better not to use a cross-linking agent when a non-fluorine-based water repellent agent is used, and that the peel strength may decrease as a cross-linking reaction proceeds.

Therefore, relation between a degree of reaction progress of the cross-linking agent and the peel strength was evaluated by conducting a peel strength test. One type of aqueous solution using the cross-linking agent and the non-fluorine-based water repellent agent as solutes was prepared. Then, an evaluation sample was prepared in which the fastener stringer was immersed in the prepared aqueous solution and the solutes were applied to the fastener stringer by drying. In terms of the drying, the degree of reaction progress was changed by changing drying time and a drying temperature. The number of evaluation samples was 15, the drying time was set to three types of 5, 7, and 9 hours, and the drying temperature was varied from 110° C. to 130° C. in increments of 5° C. for each type of drying time.

Using this evaluation sample, the peel strength test was conducted before washing. After the peel strength test, the evaluation sample was immersed in the aqueous solution using acetone as a solute, and ultrasonic waves were applied for 30 minutes to extract a cross-linking agent component contained in the evaluation sample. The cross-linking agent component was an unreacted cross-linking agent, and a mass of the unreacted cross-linking agent was determined based on a GC/MS (a gas chromatograph mass spectrometer). The degree of reaction progress of the cross-linking agent was determined by the following Equations 1, 2 based on the mass of the unreacted cross-linking agent extracted from the evaluation sample and a mass of the evaluation sample.

(unreacted cross-linking agent weight ratio wt %)= (unreacted cross-linking agent weight mg)/(fastener weight kg)×100      Equation 1

(degree of reaction progress)=1/(unreacted cross-linking agent weight ratio wt %)      Equation 2

Based on calculation results using these equations, Table 2 below and the graph of FIG. 4 were created.

TABLE 2

| Sample | Drying temperature (° C.) | Drying time (hrs) | Peel strength [N/cm] | Unreacted product (%) | Degree of reaction progress |
|---|---|---|---|---|---|
| (1) | 110 | 5 | 14.9 | 54.7577 | 0.0183 |
| (2) | 115 | 5 | 14.24 | 47.0285 | 0.0213 |
| (3) | 120 | 5 | 12.7 | 31.1626 | 0.0321 |
| (4) | 125 | 5 | 10.56 | 21.4606 | 0.0466 |
| (5) | 130 | 5 | 10.02 | 13.8409 | 0.0722 |
| (6) | 110 | 7 | 13.92 | 48.1255 | 0.0208 |
| (7) | 115 | 7 | 12.32 | 31.4842 | 0.0318 |
| (8) | 120 | 7 | 11.36 | 17.6112 | 0.0568 |
| (9) | 125 | 7 | 10.52 | 14.7321 | 0.0679 |
| (10) | 130 | 7 | 9.22 | 9.0488 | 0.1105 |
| (11) | 110 | 9 | 13.5 | 34.3395 | 0.0291 |
| (12) | 115 | 9 | 11.5 | 25.9020 | 0.0386 |
| (13) | 120 | 9 | 9.52 | 14.8127 | 0.0675 |
| (14) | 125 | 9 | 9.68 | 11.4021 | 0.0877 |
| (15) | 130 | 9 | 11.36 | 11.4263 | 0.0875 |

Figure 4:
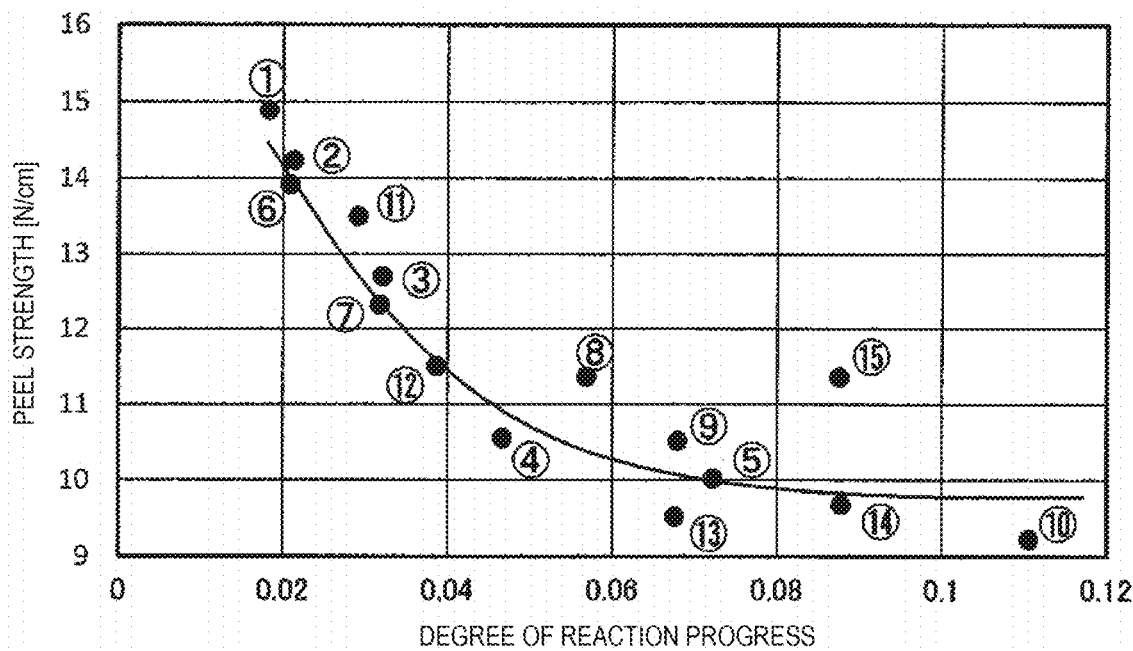
FIG. 4 is a graph showing relation between the peel strength of the reinforcing film and a degree of progress of a cross-linking reaction.

Circled numbers in Table 2 and FIG. 4 indicate the same evaluation samples, and in FIG. 4, the circled numbers for the samples are shown in a vicinity of black circles indicating numerical values. The unreacted product in Table 2 refers to a weight ratio of the unreacted cross-linking agent. In the graph of FIG. 4, a vertical axis represents parameters of the peel strength (unit: N/cm), and a horizontal axis represents parameters of the degree of reaction progress. It can be seen from Table 2 that, except for an evaluation sample 15, a mass ratio of an unreacted cross-linking product decreases as the drying time increases, and a mass ratio of the unreacted cross-linking agent decreases as the drying temperature increases. The increase in the drying time and the increase in the drying temperature means that the cross-linking reaction proceeds. Further, from the graph of FIG. 4, it can be seen that the peel strength decreases as the cross-linking reaction proceeds, and it was proved that the assumption of the present inventors based on Table 1 and FIG. 3 was correct.

The fastener chain (the water repellent product) according to the first embodiment of the present invention is produced with an aqueous solution (an aqueous solution containing the non-fluorine-based water repellent agent as a solute) containing substantially no cross-linking agent in the water repellent treatment step of the production process of the fastener chain. In other words, water repellent treatment is performed without substantially containing the cross-linking agent for chemically bonding the non-fluorine-based water repellent agent and the fibers.

The expressions "an aqueous solution containing substantially no cross-linking agent in the water repellent treatment step of the production process of the fastener chain" and "water repellent treatment is performed without substantially containing the cross-linking agent for chemically bonding the non-fluorine-based water repellent agent and the fibers" have the same meaning as described in a section of solution to problem. Even if the fastener chain contains the cross-linking agent, a content of the cross-linking agent is so small that the cross-linking agent cannot be assumed to be intended to chemically bond the non-fluorine-based water repellent agent and the fibers. In numerical terms, the expressions mean that the cross-linking agent contained in the fastener chain is water repellent treated with an aqueous solution having a cross-linking agent concentration of less than 0.1% with respect to a mass of the water repellent product. If numerically exemplified from the results in Table 1, the descriptions mean that the water repellent treatment is performed with an aqueous solution having a cross-linking agent concentration of less than 0.25%. In other words, "containing substantially no cross-linking agent" means that the component of the cross-linking agent cannot be found even by executing component analysis, or that even if found, the cross-linking agent is a result of being used in the water repellent treatment step at a concentration in the aqueous solution of less than 0.1% with respect to a mass of the fastener chain. This amount is not an amount that intentionally improves an adhesion strength between the tape and the non-fluorine-based water repellent agent by conducting the cross-linking reaction. This numerical value is obtained by rounding a number of a next digit of a display digit.

The mass of the fastener chain is a mass of the pair of fastener stringers. Further, the mass of the fastener stringer is a total mass of a mass of the tape, a mass (including a mass of the core string in the element row) of the element row, and a mass of the sewing thread that sews the element row on the tape, and does not include a mass of the slider, the stopper, and the opening tool.

The present invention is not limited to the above-described embodiment, and can be appropriately modified without departing from the gist of the present invention.

For example, in the above-described embodiment, the water repellent product is a fastener chain. However, the present invention is not limited thereto. The tape of the fastener chain is basically a fabric formed by weaving or knitting threads. From a fact that a technical idea of the present invention can be applied to the tape of the fastener chain, it is clear that the present invention can also be applied to all ordinary fabrics such as fabrics and knits. As a specific application example, it is clear that the technical idea of the present invention can be effectively applied to a case in which a fabric that has been water repellent treated with the non-fluorine-based water repellent agent and another fabric are bonded to each other via a resin component (including an adhesive layer, a resin film, or the like). That is, by applying the technical idea of the present invention, it is possible to prevent a decrease in a peel strength between the fabric that is water repellent treated with the non-fluorine-based water repellent agent and the adhesive resin component (including the adhesive layer, the resin film, or the like). As a result, the fabric that is water repellent treated with the non-fluorine-based water repellent agent and the other fabric can be bonded without decreasing a bonding strength between the fabric and the other fabric.

It is obvious that the technical idea of the present invention can also be effectively applied to a case in which the tape of the fastener chain that has been water repellent treated with the non-fluorine-based water repellent agent and a garment fabric that has been water repellent treated with the non-fluorine-based water repellent agent are bonded to each other via the resin component (including the adhesive layer, the resin film, or the like).

According to the water repellent product and the method for producing the water repellent product in the present invention, since a peel strength between the water repellent fabric and the resin component is not affected by the cross-linking agent, a peel strength between the fiber and the resin component is improved.

What is claimed is:

1. A water repellent product comprising:
   a water repellent fabric in which a non-fluorine-based water repellent agent is applied to a fabric formed of a fiber; and
   a resin component attached to the water repellent fabric, wherein
   the water repellent product contains substantially no cross-linking agent for chemically bonding the non-fluorine-based water repellent agent and the fiber.

2. The water repellent product according to claim 1, wherein
   the water repellent product is a fastener chain in which a pair of fastener stringers mesh with each other at facing side edge portions, and
   the fastener stringers include tapes which serve as the water repellent fabric and element rows which are fixed at the facing side edge portions of the tapes and mesh with each other.

3. The water repellent product according to claim 2, wherein
   the fastener chain includes a reinforcing film serving as the resin component attached at end portions of the tapes in a longitudinal direction.

4. A method for producing a water repellent product including a water repellent fabric in which a non-fluorine-based water repellent agent is applied to a fabric formed of a fiber and a resin component attached to the water repellent fabric, the method comprising:
   performing a water repellent treatment while containing substantially no cross-linking agent for chemically bonding the non-fluorine-based water repellent agent and the fiber.

5. The method according to claim 4, wherein
   the water repellent product is a fastener chain in which a pair of fastener stringers mesh with each other at facing side edge portions, and the fastener stringers include tapes which serve as the water repellent fabric and element rows which are fixed at the facing side edge portions of the tape and mesh with each other.

6. The method according to claim 5, wherein
the fastener chain includes a reinforcing film serving as the resin component attached at end portions of the tapes in a longitudinal direction.

7. The method according to claim 4, wherein
when the fabric is immersed in an aqueous solution using at least the non-fluorine-based water repellent agent as a solute, a concentration of the cross-linking agent in the aqueous solution is a concentration containing substantially no of the cross-linking agent.

* * * * *

UNITED STATES PATENT AND TRADEMARK OFFICE
CERTIFICATE OF CORRECTION

PATENT NO. : 11,712,091 B2
APPLICATION NO. : 17/166802
DATED : August 1, 2023
INVENTOR(S) : Toshiyuki Jyogan et al.

It is certified that error appears in the above-identified patent and that said Letters Patent is hereby corrected as shown below:

In the Specification

In Column 2, Line 16, after "substantially no" delete "a".

In the Claims

In Column 11, Line 14, in Claim 7, delete "substantially no of the cross-linking agent." and insert -- substantially no cross-linking agent. --.

Signed and Sealed this
Fifth Day of December, 2023

Katherine Kelly Vidal
*Director of the United States Patent and Trademark Office*